US011800827B2

(12) United States Patent
Kreider et al.

(10) Patent No.: US 11,800,827 B2
(45) Date of Patent: Oct. 31, 2023

(54) USING NON-REAL-TIME COMPUTERS FOR AGRICULTURAL GUIDANCE SYSTEMS

(71) Applicant: AgJunction LLC, Scottsdale, AZ (US)

(72) Inventors: Thomas R. Kreider, Peoria, AZ (US); Mark Alan Villela, Glendale, AZ (US); Michael Brett McMickell, Scottsdale, AZ (US); Luke Andrew McBeath, Scottsdale, AZ (US)

(73) Assignee: AGJUNCTION LLC, Scottsdale, AZ (US)

( * ) Notice: Subject to any disclaimer, the term of this patent is extended or adjusted under 35 U.S.C. 154(b) by 394 days.

(21) Appl. No.: 16/570,358

(22) Filed: Sep. 13, 2019

(65) Prior Publication Data
US 2020/0084955 A1 Mar. 19, 2020

Related U.S. Application Data

(60) Provisional application No. 62/731,698, filed on Sep. 14, 2018.

(51) Int. Cl.
*A01B 69/04* (2006.01)
*G05D 1/00* (2006.01)
(Continued)

(52) U.S. Cl.
CPC .......... *A01B 69/008* (2013.01); *A01B 79/005* (2013.01); *G05D 1/0016* (2013.01);
(Continued)

(58) Field of Classification Search
None
See application file for complete search history.

(56) References Cited

U.S. PATENT DOCUMENTS 5,194,851 A    3/1993  Kraning et al.
5,390,125 A    2/1995  Sennott et al.
(Continued)

FOREIGN PATENT DOCUMENTS

JP    2006 177792 A    7/2006
WO    2011/032205 A1   3/2011
(Continued)

OTHER PUBLICATIONS

Noh, Kwang-Mo, Self-tuning controller for farm tractor guidance, Iowa State University Retrospective Theses and Dissertations, Paper 9874, (1990).
(Continued)

*Primary Examiner* — Isaac G Smith
*Assistant Examiner* — Jennifer M Anda
(74) *Attorney, Agent, or Firm* — Schwabe Williamson & Wyatt

(57) ABSTRACT

A precision steering computer installed on a tractor uses waypoints generated by a hand-held smart-device to steer a tractor. The smart-device is the operators primary interface and is a component of the entire precision agriculture guidance system. The batched, time ordered waypoints represent a list of coordinates for steering the tractor. As the tractor is automatically steered in the field, the waypoints are consumed and discarded by the real-time steering computer in the order they are received from the non-real-time smart device. A planned path is generated by the tractor operator on the smart device and the tractors progress and status are displayed on the same smart-device.

21 Claims, 3 Drawing Sheets

(51) Int. Cl.
*G05D 1/02* (2020.01)
*G06F 5/06* (2006.01)
*H04W 4/021* (2018.01)
*A01B 79/00* (2006.01)

(52) U.S. Cl.
CPC ........... *G05D 1/0219* (2013.01); *G06F 5/065* (2013.01); *H04W 4/021* (2013.01); *G05D 2201/0201* (2013.01)

(56) References Cited

U.S. PATENT DOCUMENTS

| | | | |
|---|---|---|---|
| 5,663,879 | A | 9/1997 | Trovato et al. |
| 5,923,270 | A | 7/1999 | Sampo et al. |
| 6,052,647 | A | 4/2000 | Parkinson et al. |
| 6,070,673 | A | 6/2000 | Wendte |
| 6,212,453 | B1 | 4/2001 | Kawagoe et al. |
| 6,373,432 | B1 | 4/2002 | Rabinowitz et al. |
| 6,377,889 | B1 | 4/2002 | Soest |
| 6,445,983 | B1 | 9/2002 | Dickson et al. |
| 6,539,303 | B2 | 3/2003 | McClure et al. |
| 6,611,738 | B2 | 8/2003 | Ruffner |
| 6,711,501 | B2 | 3/2004 | McClure et al. |
| 6,789,014 | B1 | 9/2004 | Rekow et al. |
| 6,819,780 | B2 | 11/2004 | Benson et al. |
| 6,865,465 | B2 | 3/2005 | McClure |
| 6,876,920 | B1 | 4/2005 | Mailer |
| 7,142,956 | B2 | 11/2006 | Heiniger et al. |
| 7,162,348 | B2 | 1/2007 | McClure et al. |
| 7,277,792 | B2 | 10/2007 | Overschie |
| 7,373,231 | B2 | 5/2008 | McClure et al. |
| 7,400,956 | B1 | 7/2008 | Feller et al. |
| 7,437,230 | B2 | 10/2008 | McClure |
| 7,460,942 | B2 | 12/2008 | Mailer |
| 7,689,354 | B2 | 3/2010 | Heiniger et al. |
| RE41,358 | E | 5/2010 | Heiniger et al. |
| 7,835,832 | B2 | 11/2010 | Macdonald et al. |
| 7,885,745 | B2 | 2/2011 | McClure et al. |
| 8,018,376 | B2 | 9/2011 | McClure et al. |
| 8,190,337 | B2 | 5/2012 | McClure |
| 8,214,111 | B2 | 7/2012 | Heiniger et al. |
| 8,311,696 | B2 | 11/2012 | Reeve |
| 8,386,129 | B2 | 2/2013 | Collins et al. |
| 8,401,704 | B2 | 3/2013 | Pollock et al. |
| 8,489,291 | B2 | 7/2013 | Dearborn et al. |
| 8,521,372 | B2 | 8/2013 | Hunt et al. |
| 8,548,649 | B2 | 10/2013 | Guyette et al. |
| 8,583,315 | B2 | 11/2013 | Whitehead et al. |
| 8,583,326 | B2 | 11/2013 | Collins et al. |
| 8,589,013 | B2 | 11/2013 | Pieper et al. |
| 8,594,879 | B2 | 11/2013 | Roberge et al. |
| 8,634,993 | B2 | 1/2014 | McClure et al. |
| 8,639,416 | B2 | 1/2014 | Jones et al. |
| 8,649,930 | B2 | 2/2014 | Reeve et al. |
| 8,676,620 | B2 | 3/2014 | Hunt et al. |
| 8,718,874 | B2 | 5/2014 | McClure et al. |
| 8,768,558 | B2 | 7/2014 | Reeve et al. |
| 8,781,685 | B2 | 7/2014 | McClure |
| 8,803,735 | B2 | 8/2014 | McClure |
| 8,897,973 | B2 | 11/2014 | Hunt et al. |
| 8,924,152 | B2 | 12/2014 | Hunt et al. |
| 9,002,565 | B2 | 4/2015 | Jones et al. |
| 9,002,566 | B2 | 4/2015 | McClure et al. |
| 9,141,111 | B2 | 9/2015 | Webber et al. |
| 9,162,703 | B2 | 10/2015 | Miller et al. |
| 9,173,337 | B2 | 11/2015 | Guyette et al. |
| 9,223,314 | B2 | 12/2015 | McClure et al. |
| 9,255,992 | B2 | 2/2016 | McClure |
| 9,389,615 | B2 | 7/2016 | Webber et al. |
| 10,832,347 | B1 | 11/2020 | Westhues |
| 2002/0072850 | A1 | 6/2002 | McClure et al. |
| 2004/0186644 | A1 | 9/2004 | McClure et al. |
| 2006/0167600 | A1 | 7/2006 | Nelson, Jr. et al. |
| 2007/0156286 | A1* | 7/2007 | Yamauchi ............ G05D 1/0251 700/245 |
| 2007/0242684 | A1* | 10/2007 | Hayakawa .......... H04J 14/0227 370/406 |
| 2008/0170553 | A1* | 7/2008 | Montemurro ........... H04L 47/24 370/338 |
| 2009/0251366 | A1 | 10/2009 | McClure |
| 2010/0067598 | A1* | 3/2010 | Sampath .............. H04L 1/0046 375/295 |
| 2010/0268449 | A1 | 10/2010 | Feng |
| 2010/0274452 | A1 | 10/2010 | Ringwald et al. |
| 2012/0253744 | A1 | 10/2012 | Schmidt |
| 2014/0266877 | A1 | 9/2014 | McClure |
| 2014/0277676 | A1 | 9/2014 | Gattis |
| 2015/0175194 | A1 | 6/2015 | Gattis |
| 2016/0039454 | A1 | 2/2016 | Mortimer |
| 2016/0073573 | A1 | 3/2016 | Ethington |
| 2016/0091898 | A1 | 3/2016 | Booher |
| 2016/0154108 | A1 | 6/2016 | McClure et al. |
| 2016/0205864 | A1 | 7/2016 | Gattis et al. |
| 2016/0214643 | A1 | 7/2016 | Joughin et al. |
| 2016/0252909 | A1 | 9/2016 | Webber et al. |
| 2016/0334804 | A1 | 11/2016 | Webber et al. |
| 2016/0380914 | A1* | 12/2016 | Tuukkanen ............ H04L 67/16 709/226 |
| 2017/0248946 | A1 | 8/2017 | Ogura et al. |
| 2018/0146612 | A1 | 5/2018 | Sauder |
| 2018/0237039 | A1* | 8/2018 | Mong ................... B61L 23/005 |
| 2018/0321682 | A1 | 11/2018 | Matsumoto et al. |
| 2019/0071093 | A1 | 3/2019 | Ma et al. |
| 2019/0258251 | A1* | 8/2019 | Ditty ................... G06K 9/00805 |
| 2019/0332105 | A1* | 10/2019 | Sant ........................ G01S 19/13 |
| 2019/0385057 | A1 | 12/2019 | Litichever |
| 2020/0051035 | A1 | 2/2020 | Rossetti |
| 2020/0062365 | A1* | 2/2020 | Anderson ............ B63H 20/007 |
| 2020/0084955 | A1 | 3/2020 | Kreider |
| 2020/0110403 | A1 | 4/2020 | Antich |
| 2020/0294401 | A1 | 9/2020 | Kerecsen |
| 2020/0326711 | A1* | 10/2020 | Rimmer ............... G01C 21/203 |
| 2020/0352083 | A1 | 11/2020 | Ramachandran |
| 2020/0363796 | A1 | 11/2020 | Muro |
| 2021/0003416 | A1 | 1/2021 | Wilson |
| 2021/0026362 | A1 | 1/2021 | Wilson |
| 2021/0029877 | A1 | 2/2021 | Vandike |
| 2021/0029878 | A1 | 2/2021 | Vandike |
| 2021/0034057 | A1 | 2/2021 | Flajolet |
| 2021/0136515 | A1* | 5/2021 | Zhang ................... H04W 4/023 |
| 2021/0278834 | A1* | 9/2021 | Kendoul ............... G05D 1/0022 |

FOREIGN PATENT DOCUMENTS

| | | |
|---|---|---|
| WO | 2012/112205 A1 | 8/2012 |
| WO | 2015/073844 A1 | 5/2015 |

OTHER PUBLICATIONS

Van Zuydam,. R.P., Centimeter-Precision Guidance of Agricultural Implements in the Open Field by Means of Real Tim Kinematic DGPS, ASA-CSSA-SSSA, pp. 1023-1034 (1999).

USPTO, International Search Report and Written Opinion of the International Searching Authority for International Application No. PCT/US2020/043605, dated Nov. 23, 2020, pp. 1-14.

Van Dyke et al., GNSS Real Time Performance Monitoring and CNS/ATM Implementation, IEEE, p. 1137-1144 (2006).

Wahlstrom et al., Smartphone-Based Vehicle Telematics: A Ten-Year Anniversary, IEEE, p. 2802-2825 (2017).

Murakami et al., iFarm: Development of Cloud-based System of Cultivation Management for Precision Agriculture, IEEE, p. 233-234 (2013).

Fahmi et al, A Prototype of Monitoring Precision Agriculture System Based on WSN, IEEE, p. 323-328 (2017).

International Search Report and Written Opinion; PCT/US2019/051044; dated Jan. 8, 2020; pp. 1-10.

* cited by examiner

USING NON-REAL-TIME COMPUTERS FOR AGRICULTURAL GUIDANCE SYSTEMS

The present application claims priority to U.S. Provisional Patent Application Ser. No. 62/731,698, filed on Sep. 14, 2018, which is incorporated by reference in its entirety.

BACKGROUND

Precision agriculture uses technologies such as global navigation satellite systems (GNSS), inertial measurement sensors, and computers to guide a tractor through a field following carefully defined paths to improve crop yield, reduce operator fatigue, comply to environmental regulations, and reduce cost. The cost of these systems limits their application to only the largest farms with the economies of large scale required to purchase them.

Reducing the cost of precision agriculture technologies can be accomplished by leveraging common smart devices such as smart-phones and tablet computers. The primary barrier to using these devices is their inherent non-determinism where disruptions to wireless communications, application processor time allocation, and multitasking can block the steering and guidance software. Disruptions to timely operation complicate smart device integration into larger systems.

The disclosure that follows solves this and other problems.

SUMMARY

In one example, a precision steering computer installed on a tractor uses waypoints generated by the operators handheld smart-device to navigate around a field. The smart-device may be used as the primary interface for the operator and is one component of an entire precision agriculture guidance system. Batched, time ordered waypoints generated by the smart-device represent a list of coordinates for steering the tractor.

The explanation below uses the example of a tractor plowing a field. However, it should be understood that the precision agricultural guidance system may be used with any vehicle to perform any type of agricultural or non-agricultural operation. For example, the precision agricultural guidance system may be used on a combine to harvest a crop in a field or may be used with construction machinery on construction sites, such as when building a road.

As the vehicle moves over the field, the waypoints are consumed and discarded by the real-time steering computer in the order received from the non-real-time smart device. The path planned by the operator is generated by the smart device and the progress and status of the tractor are displayed on the same smart-device.

Waypoints, consisting of time ordered geo-location coordinates along the operator defined path, are generated on the smart-device in advance of a tractor arriving at those locations. These waypoints are created in large batches a minute or more before the precision steering computer on the tractor needs them to stay on the commanded path. Batch waypoint generation conform well with the computing architecture of non-real-time devices such as smart-devices, laptops, and desktop computers and can be sent to the real-time computer within the precision steering system using a wired connection or a wireless technology such as Bluetooth or WiFi.

Batched waypoints are stored in the precision steering computer in the order they are used for steering the vehicle along a predetermined path. In the event of a service interruption with the users smart-device or a communication failure between the smart-device and the steering computer, the steering computer can continue to pull future waypoints from the queued waypoint list ensuring the next waypoint is available. If the waypoint queue is depleted prior to the users smart-device providing the next batch of waypoints, the steering computer can notify the user to stop the tractor.

The division of computing between the real time domain of the steering computer and the non-real-time domain of the smart device is facilitated by way of the queue of waypoints are stored and transmitted as batches representing many minutes of future tractor travel.

While this summary describes a specific instance with a smart device generates an entire planned path of waypoints, it should be apparent that any source of waypoints could be used either onboard the tractor or remotely. Removing the non-real-time planning activities from the real-time steering system enables the use of internet-based control including remote operation as well as fully autonomous control from internet software-as-a-service or cloud computing sources.

Additional aspects and advantages will be apparent from the following detailed description of preferred embodiments, which proceeds with reference to the accompanying drawings.

DETAILED DESCRIPTION

Figure 1:
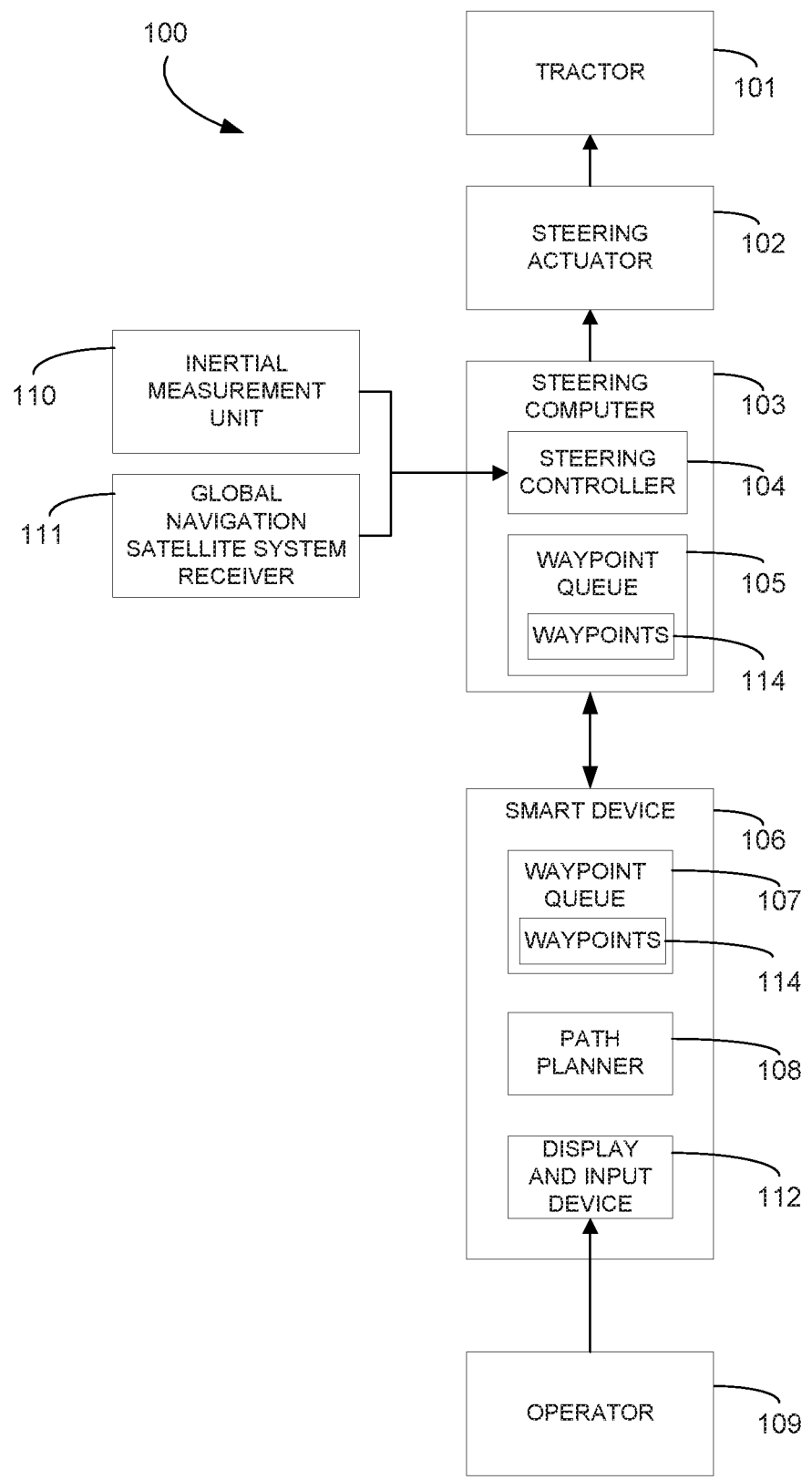
FIG. 1 illustrates a guidance steering system that steers a tractor with a non-deterministic, non-real-time guidance computer.

FIG. 1 shows a precision guidance system 100 used for steering a tractor 101. A steering computer 103 changes the attitude of tractor 101 by sending commands to a steering actuator 102 to turn a steering wheel of tractor 101 or to regulate a hydraulic steering actuator. Steering controller software 104 operated by steering computer 103 uses inputs from an inertial measurement unit (IMU) 110 and a global navigation satellite system (GNSS) 111 to compute a steering correction based on a computed error in the location of tractor 101 versus a current waypoint command from a waypoint queue 105. Steering computer 103 is known to those skilled in the art and are therefore not described in further detail. One example steering computer is sold by AgJunction, Inc., 9105 E. Del Camino Dr. #115 Scottsdale, Ariz. USA 85258.

A tractor operator 109 uses a smart device 106 to plan a route for tractor 101 through a field. Smart device 106 may be a smart phone, tablet computer, laptop computer, or any other portable or handheld device. The tractor operator 109 uses path planner software 108 operating in smart device 106 when prepare the path for automatically steering tractor 101. Path planning software, such as chart plotters, are known to those skilled in the art and are therefore not described in further detail.

The output of path planner 108 is a time ordered series of waypoints 114 stored in an output waypoint queue 107 of smart device 106. Smart device 106 transmits waypoints 114 in output waypoint queue 107 via wireless or wired communication channel to a receiving input waypoint queue 105 in steering computer 105. For example, waypoints 114 may be transmitted via a WiFi or Bluetooth wireless connection or via a universal serial bus (USB) wired connection.

To facilitate efficient data transfers, smart device 106 may send waypoints 114 in batches to steering computer 103. Steering controller 104 consumes received waypoints 114 from local input waypoint queue 105 as tractor 101 travels over the commanded location within each waypoint 114. For example, steering controller 104 steers from a current location to a next waypoint 114 in waypoint queue 105. After reaching the next waypoint 114, steering controller 104 steers to a next subsequently stored waypoint 114 in waypoint queue 105.

Figure 2:
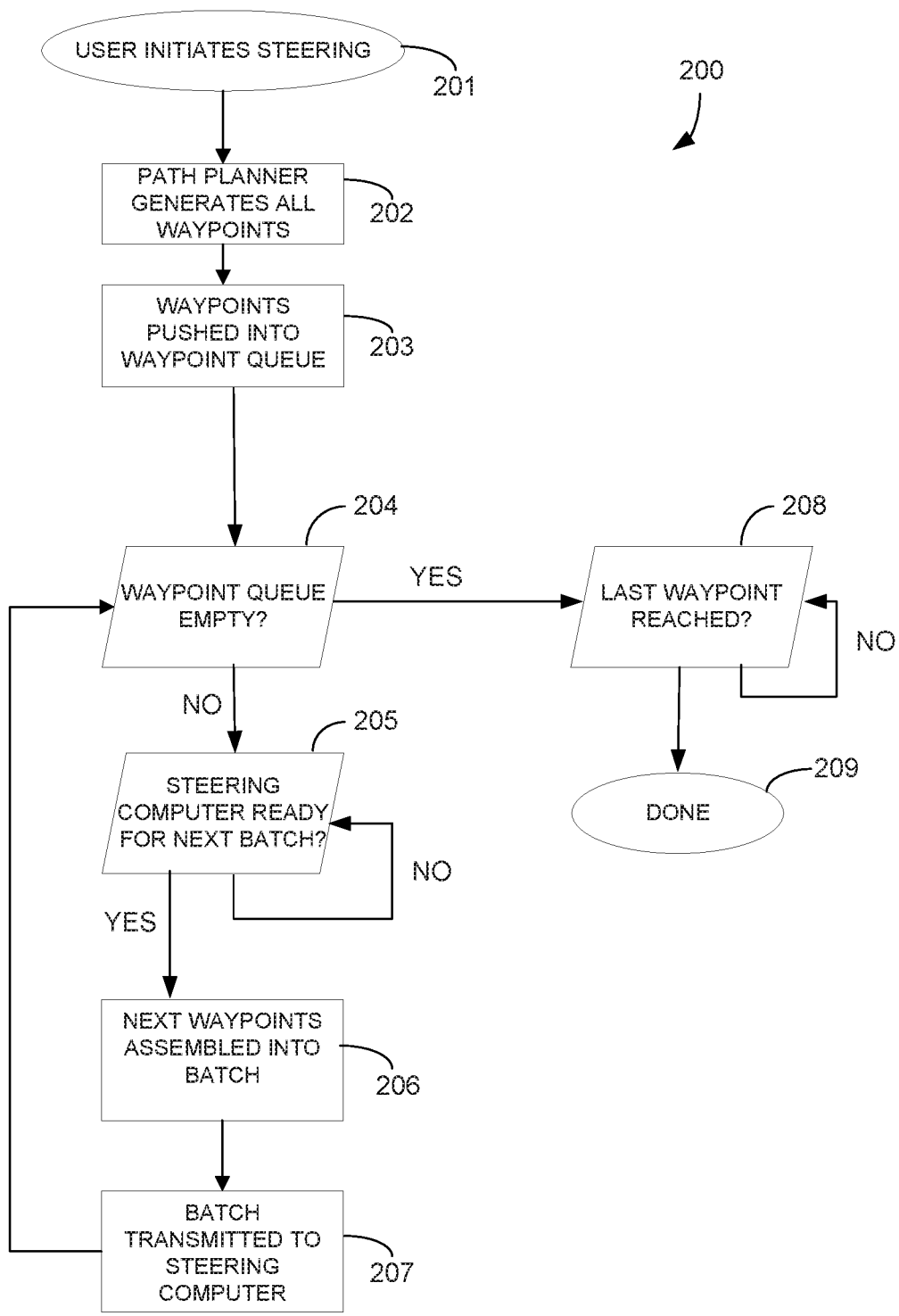
FIG. 2 illustrates operations of the precision guidance system shown in FIG. 1.

FIG. 2 shows an overall process 200 for computing, communicating, and executing steering operations based on a series of waypoints 114. Referring to FIGS. 1 and 2, tractor operator 109 in operation 201 initiates automatic steering process 200 where smart device 106 generates waypoints 114 and steering computer 103 generates steering commands based on waypoints 114.

In operation 202, path planner 108 in smart device 106 uses a previously defined path through a field defined by tractor operator 109 to generate a time series of waypoints 114. For example, smart device 106 may include a user interface 112 with a display and keyboard or touch screen input. Path planner 108 may display an electronic map of a field on user interface 112. Operator 109 then may select points on the electronic map to create a field path for tractor 101. Path planner 108 may generate a set of waypoints 114 that each include a latitude, longitude, and a time identifier indicating the order waypoints 114 were selected by operator 109.

In operation 203, smart device 106 pushes waypoints 114 into waypoint queue 107 prior to transmission. Smart device 106 then transmits a group or batch of the waypoints 114 for the field path to waypoint queue 105 in steering computer 103.

In operation 204, smart device 106 enters a loop waiting for waypoint queue 107 in smart device 106 to be empty 204 which indicates the last waypoints 114 of the path have been transmitted by smart device 106 to steering computer 103.

Prior to transmitting waypoints 114 to steering computer 103, smart device 106 in operation 205 queries steering computer 103 for the status of waypoint queue 105. If input queue 105 in steering computer 103 is full, or steering computer 103 is busy, smart device 106 will hold-off transmitting additional waypoints 114 and wait before querying steering computer 103 again. This buffering protocol allows use of a low-cost shallow buffer depth for waypoint queue 105 in steering computer 103.

In operation 205, smart device 106 may receive a message back from steering computer 103 indicating steering computer 103 is ready to receive more waypoints. Smart device 106 in operation 206 then bundles a next number of waypoints from output queue 107 into a batch appropriate to the size of memory used as waypoint input queue 105. Smart device 106 in operation 207 then transmits the batch of waypoints 114 to queue 105 in steering computer 103 prior to returning to operation 204.

Smart device 208 starts operation 208 after the last waypoint 114 is transmitted from waypoint queue 107 to waypoint input queue 105 in the steering computer 103. Smart device 106 then continuously queries steering computer 103 in operation 208 waiting for tractor 101 to reach the last waypoint. When smart device 208 receives a message back from steering computer 103 indicating the last waypoint has been reached, smart device 106 in operation 209 may display a message on user interface display 112 indicating tractor 101 has reached the end of the selected path.

As mentioned above, precision steering system 100 includes a first navigation computing device 106 configured to generate a time series of geo-location waypoints 114 for a path. Second steering computing device 103 includes input buffer 105 configured to receive the geo-location waypoints from first navigation computing device 106. Second computing device 103 is configured to generate steering commands for steering vehicle 101 based on waypoints 114 received by input buffer 105.

First navigation computing device 106 may be a non-real-time computer configured to run path planning software on a best-effort schedule and second computer 103 may be a real-time computer running steering control software at a periodic rate. In one example, first navigation computing device 106 may operate on a handheld smart device and the second steering computing device 103 may operate on a dedicated vehicle steering control system coupled to steering actuator 102 that steers vehicle 101 based on the steering commands.

First navigation computing device 106 may transmit geo-location waypoints 114 to input buffer 105 on second computer 103 over a wireless network. In another example, first navigation computing device 106 may transmit geo-location waypoints 114 in batches to input buffer 105 in second computer 103.

In one example, second steering computing device 106 uses input buffer 105 as a First-In-First-Out (FIFO) queue for processing geo-location waypoints 114. In another example, second steering computing device 103 is configured to send status messages to first navigation computing device 106 indicating when the First-In-First-Out queue is ready to accept additional geo-location waypoints 114.

In one example, first navigation computing device 106 includes output buffer 107 for storing the geo-location waypoints 114. First navigation computing device 106 also may operate output buffer 107 as a First-In-First-Out (FIFO) queue first buffering geo-location waypoints 114 and then transmitting the buffered geo-location waypoints 114 to second steering computing device 103.

In one example, path planner 108 repeatedly sends queries to steering controller 104 to check for available space in queue 105. Additional batches of waypoints 114 are sent to queue 105 based on the available space. For example, second steering computing device 103 may send a first message to first navigation computing device 106 indicating input buffer 105 is approaching capacity for storing the geo-location waypoints 114. The message may cause first navigation computing device 106 to stop sending additional geo-location waypoints 114 until receiving a second continue transmitting message from second steering computing device 103.

In another example, second steering computing device 103 is configured to send a message to first navigation computing device 106 indicating a current capacity of input buffer 105. First navigation computing device 106 may decide to send additional geo-location waypoints 114 to second steering computing device 103 based on the current capacity of input buffer 105. In one example, first navigation computing device 106 is configured to encode geo-location waypoints 114 transmitted to second steering computing device 103 to reduce transmission errors. For example, first navigation computing device 106 may use orthogonal frequency-division multiplexing (OFDM) to overcome errors in mobile communication channels.

As also explained above, a first program, such as path planner 108, generates a time series of future geo-location waypoints 114 for a selected vehicle path and transmits waypoints 114 over a communication channel to an asynchronous buffer 105. A second program, such as steering controller 104, generates steering commands for steering vehicle 101 based on the geo-location waypoints 114 in buffer 105.

In another embodiment, a same computing device 106 or 103 runs first program 108 and second program 104. In another example, first computing device 106 runs first program 108 and second computing device 103 operating asynchronously from first computing device 106 runs second program 104. In one example, first program 108 and second program 104 run on separate processor cores in a same physical central processing unit.

In another example, first program 108 and second program 104 run on a same processing device 106 or 103 controlled by a time partitioned operating system. In yet another example, first program 108 and second program 104 may run on a same processing device 106 or 103. An operating system running on the processing device 106 or 103 may asynchronously generate target waypoints 114 with first program 108 and the steering commands with second program 104.

Utilizing smart device 208 in conjunction with steering computer 103 provides many technical computing advantages. For example, a large amount of memory storage can be offloaded onto start device 106. Further, the computational and memory requirements for operating electronic maps, chart plotters/path planners, and display and user input interfaces can all be offloaded to smart device 106 or to cloud based services accessed by smart device 106. In addition, any wireless communication hardware or software needed to communicate with a central server or cloud based services that may provide electronic maps and path planning software can also be offloaded to smart device 106 and/or the cloud based service.

Precision agriculture guidance system 100 lowers the cost of precision agriculture to improve yield, reduce fatigue, and lower ecological impact of farming. It enables a commodity processing platform such as a smart-phone or tablet to act as the user interface and path planning element of an agricultural guidance system. It maintains the safety capabilities of existing systems while adding flexibility to use lower cost, non-proprietary hardware for the user interface, path planning, logging, diagnostics, and connectivity functions. These advantages also include the ability to scale a single guidance system into a larger coordinated fleet without requiring expensive on-premises computing or communications hardware.

Figure 3:
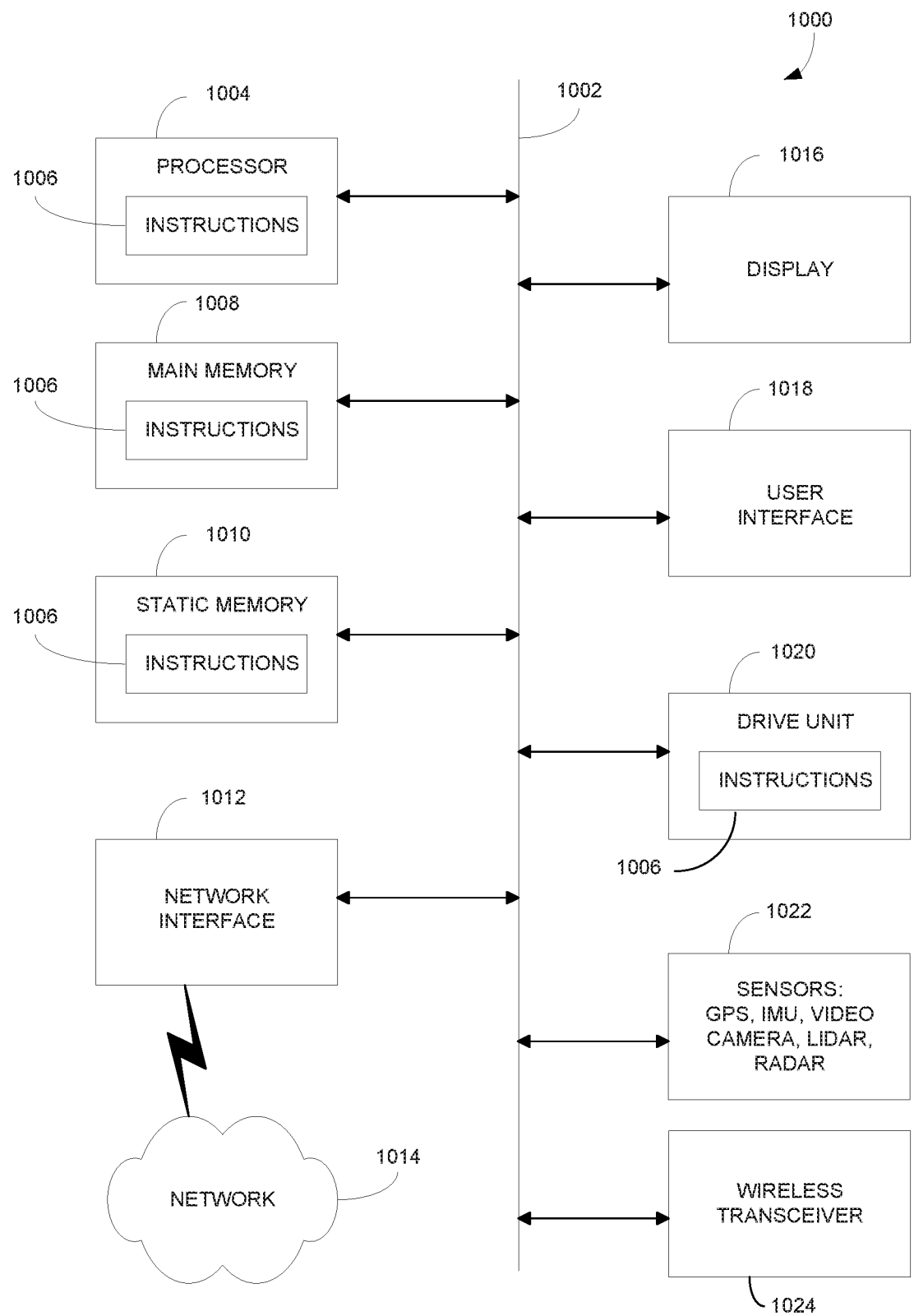
FIG. 3 shows an example computer system used in the guidance system.

FIG. 3 shows a computing device 1000 that may be used for implementing or operating steering computer 103 or smart device 106 used in precision guidance system 100 discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, central processing unit, programmable logic device, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT) and a user interface 1018, such as a keyboard, mouse, touch screen, etc. All of the components of computing device 1000 may be connected together via a bus 1002 and/or network.

Computing device 1000 may include any combination of sensors 1022 including, but not limited to, GSP, IMU, video camera, LIDAR, and radar. Computing device 100 also may include a wireless transceiver 1024 for wirelessly transmitting and receiving commands to and from other computing devices.

For the sake of convenience, operations may be described as various interconnected or coupled functional blocks or diagrams. However, there may be cases where these functional blocks or diagrams may be equivalently aggregated into a single logic device, program or operation with unclear boundaries. Having described and illustrated the principles of a preferred embodiment, it should be apparent that the embodiments may be modified in arrangement and detail without departing from such principles.

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. A system, comprising:
   a first navigation computing device configured to:
   in a non-real time domain on a best-effort schedule, generate a time series of geo-location waypoints for a path;
   store the generated geo-location waypoints in an output buffer of the first navigation computing device;
   identify an available capacity of an input buffer of a second steering computing device; and
   transmit a plurality of the stored geo-location waypoints from the output buffer of the first navigation computing device to the input buffer of the second steering computing device, wherein a number of the plurality of geo-location waypoints transmitted is based on the identified available capacity; and
   the second steering computing device, wherein the second steering computing device is configured to, at a periodic rate in a real time domain, generate steering commands for steering a vehicle based on the plurality of geo-location waypoints in the input buffer.

2. The system of claim 1, wherein the first navigation computing device is configured to run path planning software on the best-effort schedule.

3. The system of claim 1, wherein the first navigation computing device operates on a handheld smart device and the second steering computing device operates on a dedicated vehicle steering control system coupled to a steering actuator that steers the vehicle based on the steering commands.

4. The system of claim 1, wherein the first navigation computing device transmits the plurality of geo-location waypoints to the input buffer over a wireless network.

5. The system of claim 1, wherein the first navigation computing device transmits the plurality of geo-location waypoints in batches to the input buffer in the second steering computing device, and wherein a size of a batch is based on the identified capacity of the input buffer.

6. The system of claim 1, wherein the second steering computing device uses the input buffer as a First-In-First-Out queue for processing the plurality of geo-location waypoints.

7. The system of claim 6, wherein the second steering computing device is configured to send status messages to the first navigation computing device indicating when the First-In-First-Out queue is ready to accept additional geo-location waypoints.

8. The system of claim 6, wherein the first navigation computing device includes an output buffer for storing the generated geo-location waypoints, wherein the first navigation computing device is configured to operate the output buffer as a First-In-First-Out queue first buffering the geo-location waypoints and then transmitting the buffered generated geo-location waypoints to the second steering computing device.

9. The system of claim 1, wherein the second steering computing device is configured to send a first message to the first navigation computing device indicating the input buffer is approaching capacity for storing the plurality of geo-location waypoints, wherein the first message causes the first navigation computing device to stop sending additional geo-location waypoints until receiving a second continue transmitting message from the second steering computing device.

10. The system of claim 1, wherein the second steering computing device is configured to send a message to the first navigation computing device indicating the available capacity of the input buffer, wherein the first navigation computing device decides to send additional geo-location waypoints to the second steering computing device based on the available capacity of the input buffer.

11. The system of claim 1, wherein the first navigation computing device is configured to encode the plurality of geo-location waypoints transmitted to the second steering computing device to reduce transmission errors.

12. A method for steering a vehicle, comprising:
    using a first program to:
    in a non-real time domain on a best-effort schedule, generate a time series of future geo-location waypoints for a selected vehicle path;
    identify an available capacity of an asynchronous buffer; and
    transmit a plurality of the generated future geo-location waypoints to the asynchronous buffer, wherein a number of the plurality of future geo-location waypoints transmitted is based on the identified available capacity; and
    using a second program to, at a periodic rate in a real time domain, generate steering commands for steering the vehicle based on theplurality of future geo-location waypoints in the asynchronous buffer.

13. The method of claim 12 wherein a same computing device runs the first program and the second program.

14. The method of claim 12, wherein a first computing device runs the first program to generate the future geo-location waypoints and a second computing device runs the second program to generate the steering commands asynchronously from the generation of the future geo-location waypoints.

15. The method of claim 14, including wirelessly transmitting the plurality of future geo-location waypoints over a communication channel from the first computing device to the asynchronous buffer operating with the second computing device.

16. The method of claim 12, wherein the first and second program run on separate processor cores in a same physical central processing unit.

17. The method of claim 12, wherein the first and second program run on a same processing device controlled by a time partitioned operating system.

18. The method of claim 12, wherein the first and second program run on a same processing device and a time partitioned operating system running on the processing device generates the future geo-location waypoints with the first program and the steering commands with the second program, wherein thefuture geo-location waypoints are generated asynchronously from the generation of the steering commands.

19. A method for operating a vehicle, comprising:
using a path planner to, in a non-real time domain on a best-effort schedule, generate waypoints for steering the vehicle;
repeatedly sending queries about available space in an input queue of a steering controller from the path planner to the steering controller;
identifying, from the steering controller, an indication of available space in the input queue of the steering controller;
transmitting, from the path planner, one or more waypoints of the generated waypoints to the input queue, wherein a number of the one or more waypoints transmitted is based on the available space of the input queue of the steering controller; and
using the steering controller to, in a real time domain, generate steering commands for steering the vehicle based on the waypoints in the input queue, wherein the steering commands are generated at a periodic rate.

20. The method of claim 19, further comprising:
operating the path planner with a first computing device; and
operating the steering controller with a second computing device that generates the steering commands asynchronously from the generation of the waypoints.

21. The method of claim 20, wherein the first computing device operates in a hand held smart device and the second computing device operates on a dedicated steering computer installed on the vehicle.

\* \* \* \* \*